(12) United States Patent
Kim et al.

(10) Patent No.: US 11,801,866 B2
(45) Date of Patent: Oct. 31, 2023

(54) EMERGENCY MOTION CONTROL FOR VEHICLE USING STEERING AND TORQUE VECTORING

(71) Applicant: Canoo Technologies Inc., Torrance, CA (US)

(72) Inventors: Kilsoo Kim, Redondo Beach, CA (US); Paolo E. Pucci, Redondo Beach, CA (US)

(73) Assignee: Canoo Technologies Inc., Torrance, CA (US)

( * ) Notice: Subject to any disclaimer, the term of this patent is extended or adjusted under 35 U.S.C. 154(b) by 0 days.

(21) Appl. No.: 17/449,426

(22) Filed: Sep. 29, 2021

(65) Prior Publication Data
US 2023/0094169 A1    Mar. 30, 2023

(51) Int. Cl.
*B60W 60/00* (2020.01)
*B60W 10/20* (2006.01)
(Continued)

(52) U.S. Cl.
CPC ........ *B60W 60/0011* (2020.02); *B60W 10/04* (2013.01); *B60W 10/20* (2013.01);
(Continued)

(58) Field of Classification Search
CPC .. B60W 60/0011; B60W 10/04; B60W 10/20; B60W 50/00; B60W 2050/0031; B60W 2520/125; B60W 2552/30
(Continued)

(56) References Cited

U.S. PATENT DOCUMENTS 5,711,024 A * 1/1998 Wanke ................. B60T 8/1755
701/72
8,527,172 B2    9/2013 Moshchuk et al.
(Continued)

FOREIGN PATENT DOCUMENTS

CN    113273016 A    8/2021
DE    102006059989 A1    6/2008
(Continued)

OTHER PUBLICATIONS

Non-Final Office Action dated Mar. 25, 2020 in connection with U.S. Appl. No. 16/736,698,19 pages.
(Continued)

*Primary Examiner* — Jonathan M Dager
*Assistant Examiner* — Jean W Charleston

(57) ABSTRACT

A method includes identifying a desired path for an ego vehicle. The method also includes determining how to apply steering control and torque vectoring control to cause the ego vehicle to follow the desired path. The determination is based on actuator delays associated with the steering control and the torque vectoring control and one or more limits of the ego vehicle. The method further includes applying at least one of the steering control and the torque vectoring control to create lateral movement of the ego vehicle during travel. Determining how to apply the steering control and the torque vectoring control may include using a state-space model that incorporates first-order time delays associated with the steering control and the torque vectoring control and using a linear quadratic regulator to determine how to control the ego vehicle based on the state-space model and the one or more limits of the ego vehicle.

21 Claims, 8 Drawing Sheets

(51) Int. Cl.
  *B60W 10/04* (2006.01)
  *B60W 50/00* (2006.01)
(52) U.S. Cl.
  CPC ..... *B60W 50/00* (2013.01); *B60W 2050/0031* (2013.01); *B60W 2520/125* (2013.01); *B60W 2552/30* (2020.02)
(58) Field of Classification Search
  USPC .......................................................... 701/25
  See application file for complete search history.

(56) References Cited

U.S. PATENT DOCUMENTS

| | | | |
|---|---|---|---|
| 8,647,763 | B2 | 2/2014 | Tennessen et al. |
| 8,825,335 | B2* | 9/2014 | Rylander ................ G06F 17/00 701/82 |
| 8,989,981 | B2* | 3/2015 | Yamakado ........... B60W 10/119 701/72 |
| 9,278,713 | B2* | 3/2016 | Moshchuk ......... B62D 15/0265 |
| 9,701,307 | B1* | 7/2017 | Newman ............... B60W 10/04 |
| 9,912,023 | B1 | 3/2018 | Mastrandrea et al. |
| 10,829,153 | B1 | 11/2020 | Taniguchi |
| 2004/0128042 | A1* | 7/2004 | Takahashi ............ B62D 5/0403 180/443 |
| 2004/0176899 | A1 | 9/2004 | Hallowell |
| 2004/0262991 | A1* | 12/2004 | Anwar ................. B60T 8/1755 303/140 |
| 2006/0086556 | A1 | 4/2006 | Matsuno |
| 2008/0299448 | A1 | 12/2008 | Buck et al. |
| 2010/0104938 | A1 | 4/2010 | Hermann |
| 2010/0212338 | A1 | 8/2010 | Hermann et al. |
| 2011/0293998 | A1 | 12/2011 | Sato et al. |
| 2012/0107663 | A1 | 5/2012 | Burgers et al. |
| 2013/0004820 | A1 | 1/2013 | Tennessen et al. |
| 2016/0118700 | A1 | 4/2016 | Perumalla et al. |
| 2017/0005377 | A1 | 1/2017 | Rong |
| 2017/0092999 | A1 | 3/2017 | Tarlau et al. |
| 2017/0279172 | A1 | 9/2017 | Tucker |
| 2017/0301964 | A1 | 10/2017 | Murakami et al. |
| 2017/0352931 | A1 | 12/2017 | Yoshida et al. |
| 2017/0358833 | A1 | 12/2017 | Jalilevand et al. |
| 2018/0145382 | A1 | 5/2018 | Harris et al. |
| 2018/0297594 | A1 | 10/2018 | Takahashi et al. |
| 2018/0359877 | A1 | 12/2018 | Wang et al. |
| 2019/0176801 | A1 | 6/2019 | Ruybal et al. |
| 2019/0276039 | A1 | 9/2019 | Kambe et al. |
| 2020/0079391 | A1* | 3/2020 | Jonasson ............... B60W 50/00 |
| 2020/0216085 | A1 | 7/2020 | Bobier-Tiu et al. |
| 2020/0220132 | A1 | 7/2020 | Bourke et al. |
| 2020/0290668 | A1* | 9/2020 | Moreillon ............ B62D 15/025 |
| 2021/0139016 | A1 | 5/2021 | Horiguchi et al. |
| 2021/0323551 | A1 | 10/2021 | Kvieska et al. |
| 2022/0144249 | A1 | 5/2022 | Do et al. |
| 2022/0396259 | A1 | 12/2022 | Balachandran et al. |
| 2023/0022906 | A1 | 1/2023 | Balachandran et al. |
| 2023/0026238 | A1 | 1/2023 | Arima et al. |
| 2023/0105572 | A1 | 4/2023 | Asadi et al. |

FOREIGN PATENT DOCUMENTS

| | | |
|---|---|---|
| RU | 2339125 C1 | 11/2008 |
| WO | 2020146419 A1 | 7/2020 |

OTHER PUBLICATIONS

Notice of Allowance dated Aug. 24, 2020 in connection with U.S. Appl. No. 16/736,698, 11 pages.
Notice of Allowance dated Dec. 2, 2020 in connection with U.S. Appl. No. 16/736,698, 3 pages.
International Search Report and Written Opinion of the International Searching Authority dated Apr. 16, 2020 in connection with International Patent Application No. PCT/US20/12619, 7 pages.
International Preliminary Report on Patentability dated Jul. 22, 2021 in connection with International Patent Application No. PCT/US20/12619, 6 pages.
Guo et al., "Coordinated path-following and direct yaw-moment control of autonomous electric vehicles with sideslip angle estimation", Mechanical Systems and Signal Processing, Dec. 2017, 17 pages.
Feng et al., "Estimation of Lead Vehicle Kinematics Using Camera-Based Data for Driver Distraction Detection", International Journal of Automotive Engineering, vol. 9, No. 3, 2018, 7 pages.
Wang et al., "Map-Enhanced Ego-Lane Detection in the Missing Feature Scenarios", Apr. 2020, 10 pages.
Kim et al., "Autonomous Lateral Control of Vehicle Using Direct Yaw Moment Control", U.S. Appl. No. 17/449,413, filed Sep. 29, 2021, 49 pages.
Kim et al., "Path Tracking Control for Self-Driving of Vehicle With Yaw Moment Distribution", U.S. Appl. No. 17/449,419, filed Sep. 29, 2021, 49 pages.
Mangia et al., "An integrated torque-vectoring control framework for electric vehicles featuring multiple handling and energy-efficiency models selectable by the driver," Meccanica, Mar. 2021, 20 pages.
International Search Report and Written Opinion of the International Searching Authority dated Dec. 5, 2022 in connection with International Patent Application No. PCT/US2022/076959, 11 pages.
International Search Report and Written Opinion of the International Searching Authority dated Nov. 23, 2022 in connection with International Patent Application No. PCT/US2022/076958, 9 pages.
International Search Report and Written Opinion of the International Searching Authority dated Dec. 28, 2022, in connection with International Patent Application No. PCT/US2022/077057, 11 pages.
Non-Final Office Action dated Jun. 27, 2023 in connection with U.S. Appl. No. 17/449,413, 9 pages.
Non-Final Office Action dated Apr. 21, 2023 in connection with U.S. Appl. No. 17/449,413, 12 pages.
Non-Final Office Action dated Jun. 6, 2023 in connection with U.S. Appl. No. 17/449,419, 18 pages.
Notice of Allowance dated Sep. 20, 2023 in connection with U.S. Appl. No. 17/449,419, 14 pages.

* cited by examiner

EMERGENCY MOTION CONTROL FOR VEHICLE USING STEERING AND TORQUE VECTORING

TECHNICAL FIELD

This disclosure relates generally to autonomous systems. More specifically, this disclosure relates to emergency motion control for a vehicle using steering and torque vectoring.

BACKGROUND

Advanced driving assist system (ADAS) features use automated technology to assist a vehicle's operator in driving and parking and form a foundation for autonomous driving (AD). Lateral control of an ego vehicle's position within a traffic lane is one example of an ADAS or AD feature that can be implemented for the ego vehicle, where the ego vehicle refers to the vehicle on which one or more sensors used for ADAS, AD, or other features are mounted. For example, lateral control may be used to help keep an ego vehicle at or near the center of a traffic lane during travel within the traffic lane (referred to as "lane centering"), to help keep an ego vehicle within a traffic lane during travel (referred to as "lane keeping"), or to cause an ego vehicle to move from one traffic lane to another traffic lane (referred to as "lane changing"). Lateral control may also be used to control an ego vehicle in order to avoid a potential impact, such as by applying emergency braking or evasive steering in order to avoid another vehicle or other object within the traffic lane of the ego vehicle.

SUMMARY

This disclosure relates to emergency motion control for a vehicle using steering and torque vectoring.

In a first embodiment, a method includes identifying a desired path for an ego vehicle. The method also includes determining how to apply steering control and torque vectoring control to cause the ego vehicle to follow the desired path, where the determination is based on (i) actuator delays associated with the steering control and the torque vectoring control and (ii) one or more limits of the ego vehicle. The method further includes applying at least one of the steering control and the torque vectoring control to create lateral movement of the ego vehicle during travel.

In a second embodiment, an apparatus includes at least one processing device configured to identify a desired path for an ego vehicle. The at least one processing device is also configured to determine how to apply steering control and torque vectoring control to cause the ego vehicle to follow the desired path based on (i) actuator delays associated with the steering control and the torque vectoring control and (ii) one or more limits of the ego vehicle. The at least one processing device is further configured to apply at least one of the steering control and the torque vectoring control to create lateral movement of the ego vehicle during travel.

In a third embodiment, a non-transitory machine-readable medium contains instructions that when executed cause at least one processor to identify a desired path for an ego vehicle. The medium also contains instructions that when executed cause the at least one processor to determine how to apply steering control and torque vectoring control to cause the ego vehicle to follow the desired path based on (i) actuator delays associated with the steering control and the torque vectoring control and (ii) one or more limits of the ego vehicle. The medium further contains instructions that when executed cause the at least one processor to apply at least one of the steering control and the torque vectoring control to create lateral movement of the ego vehicle during travel.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
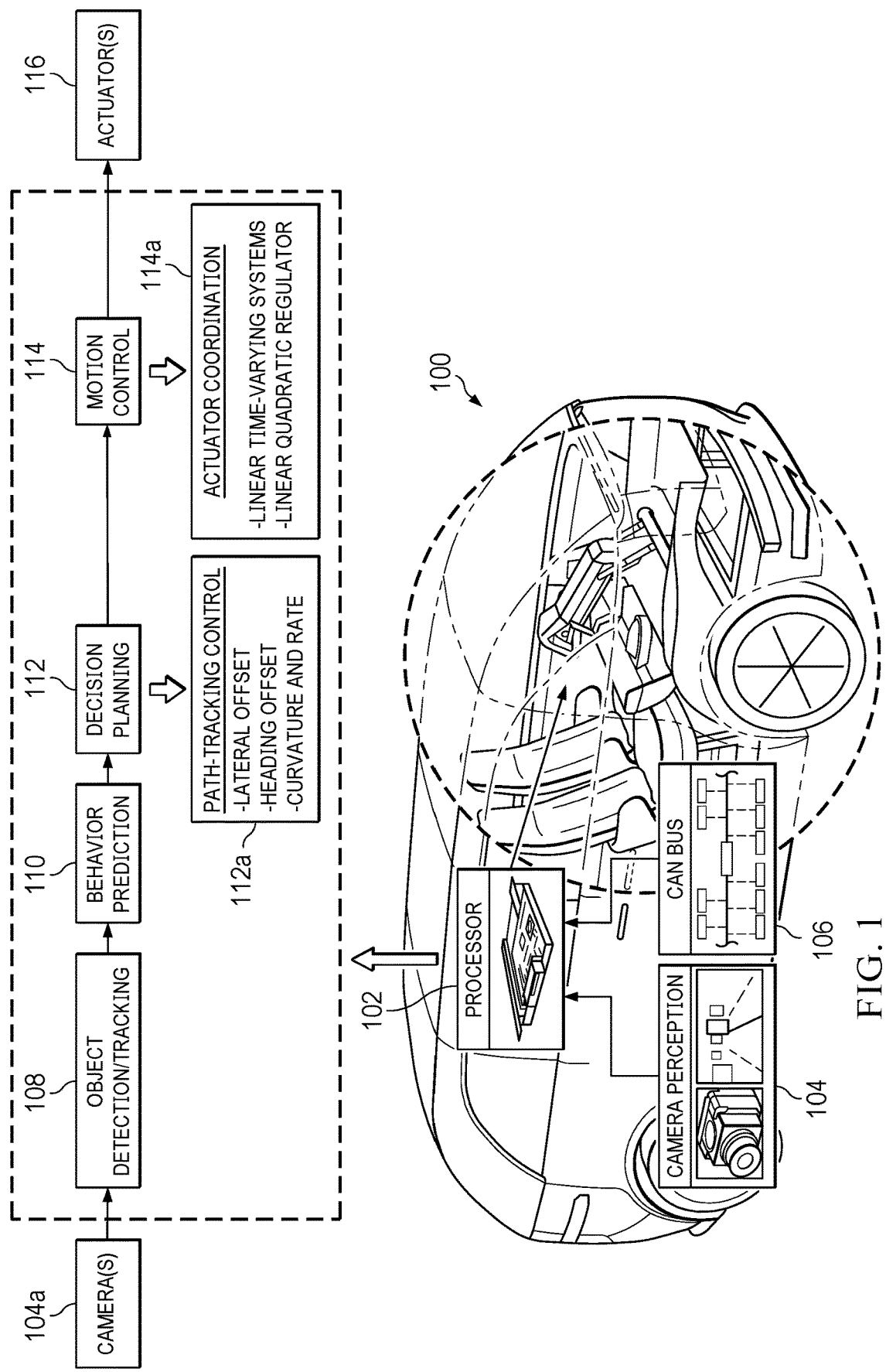
FIG. 1 illustrates an example system supporting emergency motion control for a vehicle using steering and torque vectoring according to this disclosure.

FIGS. 1 through 8, described below, and the various embodiments used to describe the principles of this disclosure are by way of illustration only and should not be construed in any way to limit the scope of this disclosure. Those skilled in the art will understand that the principles of this disclosure may be implemented in any type of suitably arranged device or system.

As noted above, advanced driving assist system (ADAS) features use automated technology to assist a vehicle's operator in driving and parking and form a foundation for autonomous driving (AD). Lateral control of an ego vehicle's position within a traffic lane is one example of an ADAS or AD feature that can be implemented for the ego vehicle, where the ego vehicle refers to the vehicle on which one or more sensors used for ADAS, AD, or other features are mounted. For example, lateral control may be used to help keep an ego vehicle at or near the center of a traffic lane during travel within the traffic lane (referred to as "lane centering"), to help keep an ego vehicle within a traffic lane during travel (referred to as "lane keeping"), or to cause an ego vehicle to move from one traffic lane to another traffic lane (referred to as "lane changing"). Lateral control may also be used to control an ego vehicle in order to avoid a potential impact, such as by applying emergency braking or evasive steering in order to avoid another vehicle or other object within the traffic lane of the ego vehicle.

In a vehicle with a conventional internal combustion engine, a drivetrain of the vehicle is used to distribute power from the engine to the wheels of the vehicle, and the drivetrain typically includes a differential gear train that helps to distribute the power to left and right wheels of the vehicle while allowing those wheels to turn at different rates. In electric vehicles, the configuration of the powertrain is far more flexible since electric vehicles may include various numbers of motor configurations. Example motor configurations can include one motor in front, one motor in back, multiple motors in front, multiple motors in back, or any suitable combination thereof. In some cases, each individual wheel of an electric vehicle can have its own independent powertrain. Among other things, these various motor configurations permit different ways of providing "torque vectoring," which refers to the ability to cause a vehicle to move laterally (left or right) by controlling the torques applied to different wheels of the vehicle (rather than turning the vehicle's steering wheel). Torque vectoring is performed by applying different torques to left and right wheels of a vehicle, which causes the vehicle to move laterally in the direction of the wheel having the lower torque. These vehicles still support "steering control," which allows a vehicle operator to control the steering of the vehicle's wheels using a steering wheel.

This disclosure provides techniques for implementing emergency motion control for a vehicle using steering and torque vectoring. As described in more detail below, a desired path for an ego vehicle can be determined, such as based on sensor measurements captured at the ego vehicle. The desired path may identify, for example, a specified path that allows the ego vehicle to avoid a collision or other impact with an object or other obstacle in the ego vehicle's current traffic lane. The desired path can be used to identify whether and how steering control and/or torque vectoring control should be used by the ego vehicle to implement a maneuver or other movement that keeps the ego vehicle on the desired path. For instance, one or more weights can be applied to the steering control and the torque vectoring control in order to determine the extent to which each type of control is used to implement a specified maneuver or other movement of the ego vehicle. Factors such as actuator delay times and vehicle tire grips (during both steering control and torque vectoring control) can be considered when determining whether and to what extent each of steering control and torque vectoring control is used to implement the specified movement of the ego vehicle. This allows an emergency maneuver or other movement of the ego vehicle to be performed in an improved or optimal manner, ideally while reducing or avoiding unstable vehicle motion.

FIG. 1 illustrates an example system 100 supporting emergency motion control for a vehicle using steering and torque vectoring according to this disclosure. In this particular example, the system 100 takes the form of an automotive vehicle, such as an electric vehicle. However, any other suitable system may support autonomous lateral control, such as other types of vehicles, autonomous robots, or other systems.

As shown in FIG. 1, the system 100 includes at least one processor 102 configured to control one or more operations of the system 100. In this example, the processor 102 may interact with one or more sensors 104 and with one or more components coupled to a bus 106. In this particular example, the one or more sensors 104 include one or more cameras or other imaging sensors, and the bus 106 represents a controller area network (CAN) bus. However, the processor 102 may interact with any additional sensor(s) and communicate over any other or additional bus(es).

In this example, the sensors 104 include one or more cameras 104a that generate images (such as visual or infrared images) of scenes around the system 100. Other or additional types of sensors that could be used here include one or more radio detection and ranging (RADAR) sensors, light detection and ranging (LIDAR) sensors, other types of imaging sensors, or inertial measurement units (IMUs). In general, any suitable type(s) of sensor(s) 104 may be used to collect information for processing by the system 100, and this disclosure is not limited to any specific type(s) of sensor(s) 104. Measurements or other data from the sensors 104 are used by the processor 102 or other component(s) as described below to generate an identification of a desired path of the system 100, such as to identify the estimated path of a vehicle traveling in a traffic lane, and to control the movements of the system 100 along the identified path. In some cases, the sensors 104 may include a single camera 104a, such as one camera positioned on the front of a vehicle. In other cases, the sensors 104 may include multiple cameras 104a, such as one camera positioned on the front of a vehicle, one camera positioned on the rear of the vehicle, and two cameras positioned on opposite sides of the vehicle.

The processor 102 can process the information from the sensors 104 in order to detect objects around or proximate to the system 100, such as one or more vehicles, obstacles, or people near the system 100. The processor 102 can also process the information from the sensors 104 in order to perceive lane-marking lines or other markings on a road, floor, or other surface. The processor 102 can further use various information to generate predictions associated with the system 100, such as to predict the future path(s) of the system 100 or other vehicles, identify a center of a traffic lane in which the system 100 is traveling, or predict the future locations of objects around the system 100. As described below, the processor 102 can use a predicted path of the system 100 in order to determine whether steering control, torque vectoring control, or both should be used to create lateral movement or other movement of the system 100. Among other things, this can support the performance of emergency maneuvers, other evasive actions, or other movements by the system 100.

In this example, the processor 102 performs an object detection/tracking function 108, which generally involves identifying objects around the system 100 in a real-time manner based on information from the sensor(s) 104. For example, the object detection/tracking function 108 can use images from one or more cameras 104a or other sensor information to identify external objects around the system 100, such as other vehicles moving around or towards the system 100 or pedestrians or objects near the system 100. The object detection/tracking function 108 can also identify one or more characteristics of each of one or more detected objects, such as an object class (a type of object) and a boundary (such as a bounding box) around the detected object. The object detection/tracking function 108 can further track one or more of the detected objects over time, such as by collecting position information or other information associated with the same object at different times. The object detection/tracking function 108 can output information identifying each detected object and its associated characteristic (s). The object detection/tracking function 108 can use any suitable technique to perform object detection and tracking, such as by using a trained machine learning model.

The processor 102 also performs a behavior prediction function 110, which generally involves using information to predict the behavior of the system 100 itself and possibly to predict the behavior of one or more detected objects. For example, the behavior prediction function 110 may use information about lane-marking lines, positions of other objects, and other information to estimate the future path of the system 100. As particular examples, the behavior prediction function 110 may use this or other information to identify an estimated path of the system 100 to be followed in order to keep the system 100 within or centered in a current traffic lane or to move the system 100 from one traffic lane to another traffic lane. The behavior prediction function 110 may also merge information associated with detected objects, such as by combining measurements or other information about the same detected objects, and estimate the future position(s) of each detected object relative to the system 100. For instance, the behavior prediction function 110 may generate a polynomial identifying the expected path to be taken by the system 100 and a polynomial identifying the expected path to be taken by another vehicle near the system 100. The behavior prediction function 110 can use any suitable technique to perform behavior prediction, such as by using a curve fitting or filtering algorithm to estimate the path of the system 100 or a detected object.

Information from the behavior prediction function 110 (and possibly information from one or more other sources) may be provided to a decision planning function 112, which generally uses this information to determine how to adjust the operation of the system 100. For example, the decision planning function 112 may determine whether (and how) to change the steering direction of the ego vehicle (the system 100), whether (and how) to apply the brakes or accelerate the vehicle, or whether (and how) to trigger an audible, visible, haptic, or other warning. The warning may indicate that the system 100 is near another vehicle, obstacle, or person, is departing from a current traffic lane in which the vehicle is traveling, or is approaching a possible impact location with another vehicle, obstacle, or person. In general, the identified adjustments determined by the decision planning function 112 can vary widely based on the specific application. As a particular example, the decision planning function 112 may determine whether impact with a detected object may occur based on the current path of the system 100 and identify an estimated path to avoid the impact.

The decision planning function 112 can interact with one or more control functions 114, each of which can be used to adjust or control the operation of one or more actuators 116 in the system 100. For example, in an automotive vehicle, the one or more actuators 116 may represent one or more brakes, electric motors, or steering components of the vehicle, and the control function(s) 114 can be used to apply or discontinue application of the brakes, speed up or slow down the electric motors, or change the steering direction of the vehicle. In general, the specific ways in which the operations of the system 100 can vary depend on the specific system 100 being used.

In this example, the decision planning function 112 performs a path-tracking control function 112a, which generally operates to identify how the system 100 should be maneuvered in order to follow an identified path for the system 100. For example, based on an identified path for the system 100, the path-tracking control function 112a can identify a lateral offset, a heading offset, and a curvature and a rate of curvature for the path to be followed by the system 100. In some cases, the lateral offset may be expressed as a distance or rate that the system 100 should move laterally (left or right) relative to a central longitudinal axis of the system 100, and the heading offset may be expressed as a change or a rate of change to the system's direction of longitudinal travel. The curvature and the rate of curvature can be determined based on whether and to what extent the identified path for the system 100 curves. Note, however, that the identified path for the system 100 and the way(s) in which the system 100 can be controlled to follow the identified path may be expressed in any other suitable manner.

Also, in this example, the one or more control functions 114 include an actuator coordination function 114a, which generally operates to determine how steering control and/or torque vectoring control can be used to modify or otherwise control the path traveled by the system 100. For example, the actuator coordination function 114a can determine how to apply steering control and/or torque vectoring control in order to move the system 100 laterally or otherwise adjust the travel of the system 100 as needed or desired. Ideally, these operations can help to keep the system 100 traveling along the desired path. The actuator coordination function 114a may also consider one or more additional factors (such as actuator delay times and vehicle tire grips) when determining whether and how to use steering control and/or torque vectoring control in order to control the lateral movement or other movement of the system 100. For instance, the actuator coordination function 114a can support the use of one or more linear time-varying functions that consider the first-order time delays or other time delays associated with one or more actuators 116 (such as one or more braking systems, energy regeneration systems, and/or motor driving control systems of the system 100). The actuator coordination function 114a can also support the use of a linear quadratic regulator function that considers the actuator delays and vehicle tire limits. Example operations performed by the actuator coordination function 114a are provided below.

Note that the functions 108-114 shown in FIG. 1 and described above may be implemented in any suitable manner in the system 100. For example, in some embodiments, various functions 108-114 may be implemented or supported using one or more software applications or other software instructions that are executed by at least one processor 102. In other embodiments, at least some of the functions 108-114 can be implemented or supported using dedicated hardware components. In general, the functions 108-114 described above may be performed using any suitable hardware or any suitable combination of hardware and software/firmware instructions.

The processor 102 itself may also be implemented in any suitable manner, and the system 100 may include any suitable number(s) and type(s) of processors or other processing devices in any suitable arrangement. Example types of processors 102 that may be used here include one or more microprocessors, microcontrollers, digital signal processors (DSPs), application specific integrated circuits (ASICs), field programmable gate arrays (FPGAs), or discrete circuitry. Each processor 102 may also have any suitable number of processing cores or engines. In some cases, multiple processors 102 or multiple processing cores or engines in one or more processors 102 may be used to perform the functions 108-114 described above. This may allow, for instance, the processor(s) 102 to be used to process information and perform common tasks or different tasks in parallel.

Although FIG. 1 illustrates one example of a system 100 supporting emergency motion control for a vehicle using steering and torque vectoring, various changes may be made to FIG. 1. For example, various functions and components shown in FIG. 1 may be combined, further subdivided, replicated, omitted, or rearranged and additional functions and components may be added according to particular needs. Also, as noted above, the functionality for emergency motion control may be used in any other suitable system, and the system may or may not relate to automotive vehicles or other vehicles.

Figure 2A:
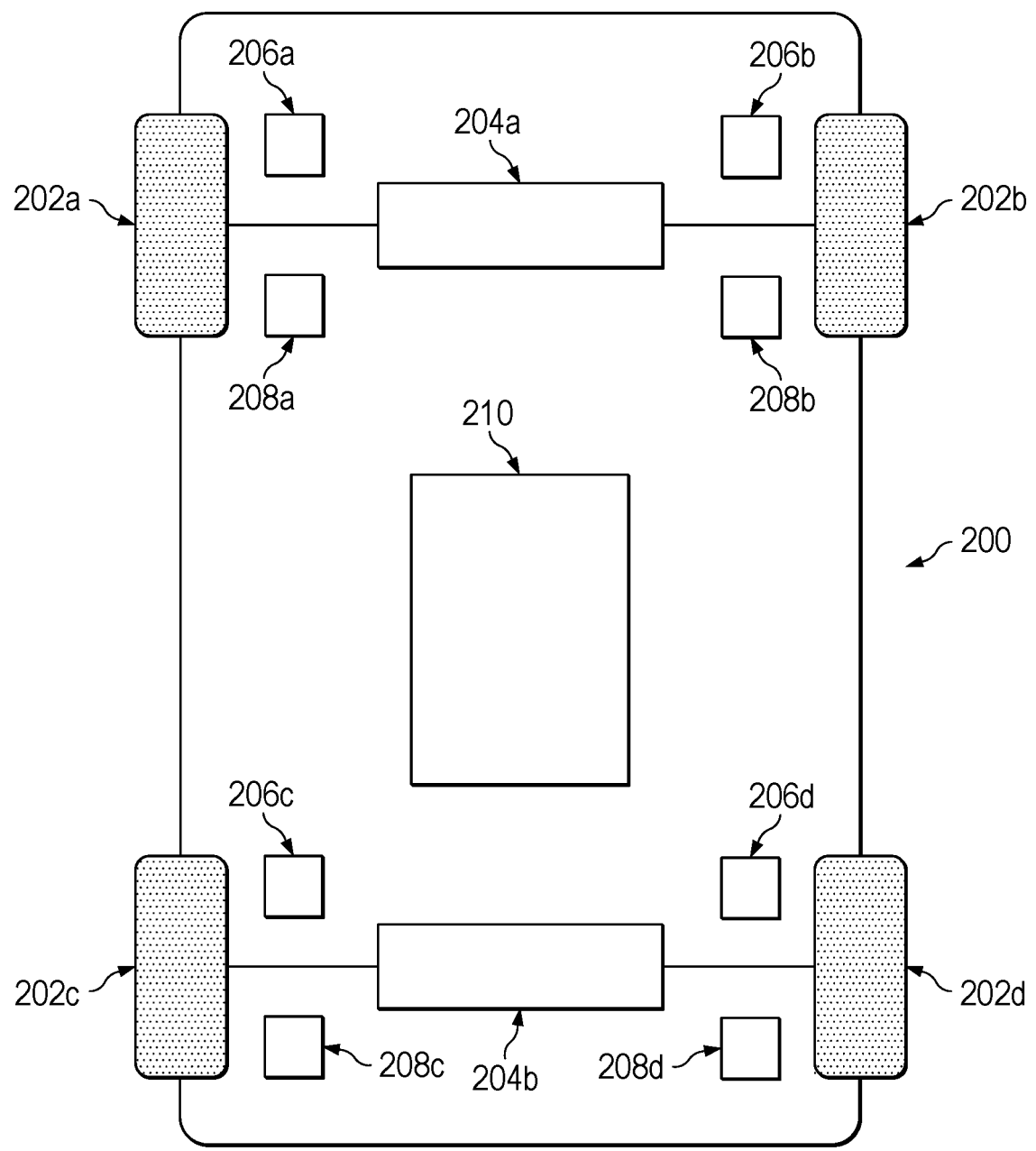
FIGS. 2A and 2B illustrate example arrangements of components in a vehicle supporting emergency motion control using steering and torque vectoring according to this disclosure.
Figure 2B:
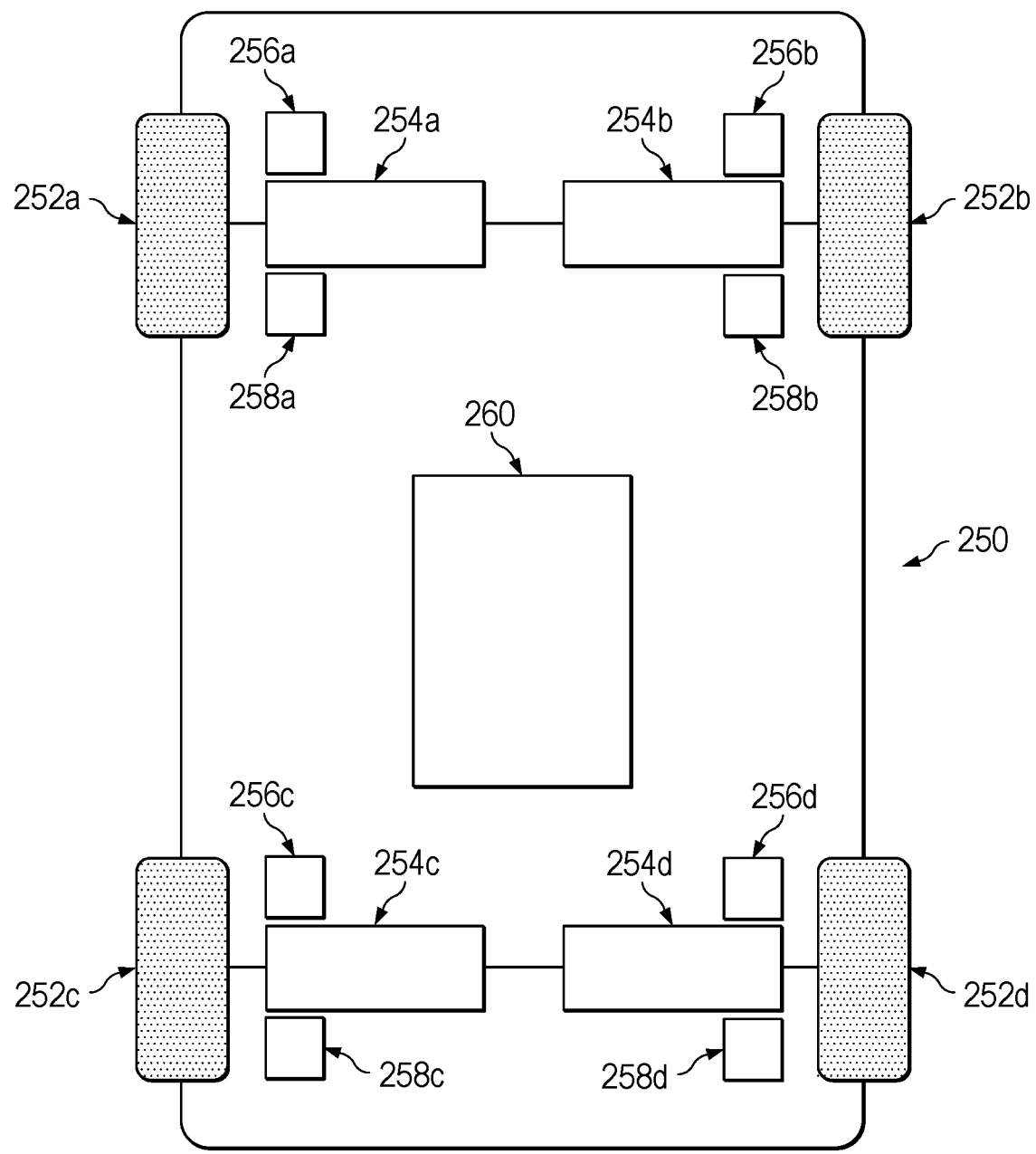

FIGS. 2A and 2B illustrate example arrangements of components in a vehicle 200, 250 supporting emergency motion control using steering and torque vectoring according to this disclosure. For ease of explanation, the vehicles 200, 250 shown in FIGS. 2A and 2B are described as representing or forming at least a portion of the system 100 shown in FIG. 1. However, the vehicles 200, 250 shown in FIGS. 2A and 2B may be used in or with any other suitable device or system.

As shown in FIG. 2A, the vehicle 200 includes four wheels 202a-202d. Rotation of the wheels 202a-202d is produced using a motor 204a positioned in a front portion of the vehicle 200 and/or a motor 204b positioned in a rear portion of the vehicle 200. Depending on the implementation, the vehicle 200 may include the motor 204a, the motor 204b, or the motors 204a-204b. Each wheel 202a-202d may have an associated braking system 206a-206d, where each braking system 206a-206d can be used to slow the rotation of the associated wheel 202a-202d. In some cases, at least some of the wheels 202a-202d may each have an associated energy regeneration system 208a-208d, which can be used to capture energy from rotation of the associated wheel 202a-202d and use the captured energy to recharge a battery subsystem or other power source 210 of the vehicle 200.

In the vehicle 200, torque vectoring may occur in two ways. First, when at least one motor 204a or 204b is driving rotation of at least one associated pair of wheels 202a-202b or 202c-202d, the braking system 206a, 206b, 206c, 206d of one wheel can be applied to a greater extent, and the braking system 206a, 206b, 206c, 206d of another wheel can be applied to a lesser extent or not at all. For example, the braking system 206a or 206c may be applied more than the braking system 206b or 206d. Second, when at least one motor 204a or 204b is driving rotation of at least one associated pair of wheels 202a-202b or 202c-202d, the energy regeneration system 208a, 208b, 208c, 208d of one wheel can be applied to a greater extent, and the energy regeneration system 208a, 208b, 208c, 208d of another wheel can be applied to a lesser extent or not at all. For instance, the energy regeneration system 208a or 208c may be applied more than the energy regeneration system 208b or 208d. In either case, less torque is applied to the wheel 202a or 202c and more torque is applied to the wheel 202b or 202d. The result is that the vehicle 200 laterally moves to the left due to the presence of more torque along the right side of the vehicle 200. Similar operations may occur to move the vehicle 200 laterally to the right by creating more torque along the left side of the vehicle 200.

As shown in FIG. 2B, the vehicle 250 includes four wheels 252a-252d. Each wheel 204a-252d may have an associated braking system 256a-256d, where each braking system 256a-256d can be used to slow the rotation of the associated wheel 252a-252d. In some cases, at least some of the wheels 252a-252d may each have an associated energy regeneration system 258a-258d, which can be used to capture energy from rotation of the associated wheel 252a-252d and use the captured energy to recharge a battery subsystem or other power source 260 of the vehicle 250. In this example, rotation of the wheels 252a-252d is produced using a pair of motors 254a-254b positioned in a front portion of the vehicle 250 and/or a pair of motors 254c-254d positioned in a rear portion of the vehicle 250. Depending on the implementation, the vehicle 250 may include the motors 254a-254b, the motors 254c-254d, or the motors 254a-254d.

In the vehicle 250, torque vectoring may occur in three ways. First, as discussed above, different braking systems 256a, 256b, 256c, 256d may be applied differently in order to create more torque along one side of the vehicle 250 and less torque along the other side of the vehicle 250. Second, as discussed above, different energy regeneration systems 258a, 258b, 258c, 258d may be applied differently in order to create more torque along one side of the vehicle 250 and less torque along the other side of the vehicle 250. Third, the motors 254a, 254b, 254c, 254d may be controlled to produce different amounts of torque on the wheels 252a, 252b, 252c, 252d, which is often referred to as "motor driving" control. For example, the motor 254a or 254c may apply more torque to the wheel 252a or 252c than the motor 254b or 254d applies to the wheel 252b or 252d. The result is that the vehicle 250 laterally moves to the right due to the presence of more torque along the left side of the vehicle 250. Similar operations may occur to move the vehicle 250 laterally to the left by creating more torque along the right side of the vehicle 250.

In this document, torque vectoring control may occur in a number of ways depending on the implementation of the specific vehicle or other system. For example, braking system control, energy regeneration system control, or motor driving control may be used individually to cause lateral movement of a vehicle 200, 250 or other system. As another example, any suitable combination of two or more of braking system control, energy regeneration system control, and motor driving control may be used collectively to cause lateral movement of a vehicle 200, 250 or other system. Specific examples of combinations of torque vectoring techniques that may be used together include torque vectoring via braking system control and motor driving control or torque vectoring via energy regeneration system control and motor driving control.

Although FIGS. 2A and 2B illustrate examples of arrangements of components in a vehicle 200, 250 supporting emergency motion control using steering and torque vectoring, various changes may be made to FIGS. 2A and 2B. For example, various components shown in FIG. 2 may be combined, further subdivided, replicated, omitted, or rearranged and additional functions and components may be added according to particular needs. As a particular example, a vehicle may not include one braking system and one energy regeneration system per wheel. In general, a vehicle may include any suitable number of wheels, any suitable number of braking systems, and (optionally) any suitable number of energy regeneration systems.

The following provides a specific example of how the actuator coordination function 114a of FIG. 1 may operate. Note that these details are for illustration and explanation only and that the actuator coordination function 114a is not limited to the specific details provided below. In some embodiments, the actuator coordination function 114a may operate by using a state-space model that captures or represents the dynamics of the system 100. One example of a state-space model for a vehicle 200, 250 or other system 100 may be expressed as follows.

$$\underbrace{\begin{bmatrix} \dot{\beta} \\ \dot{\omega} \end{bmatrix}}_{\dot{x}} = \underbrace{\begin{bmatrix} -\dfrac{2(C_r + C_f)}{mv} & \dfrac{2(l_r C_r - l_f C_f)}{mv^2} - 1 \\ \dfrac{2(l_r C_r - l_f C_f)}{I_z} & -\dfrac{2(l_r^2 C_r - l_f^2 C_f)}{I_z v} \end{bmatrix}}_{A(v)} \underbrace{\begin{bmatrix} \beta \\ \omega \end{bmatrix}}_{x} + \underbrace{\begin{bmatrix} \dfrac{2C_f}{mv} \\ \dfrac{2l_f C_f}{I_z} \end{bmatrix}}_{B(v)} \delta_f \quad (1)$$

Here, m represents a vehicle's mass, v represents the vehicle's velocity, $I_z$ represents a moment of inertia of the vehicle with respect to the vertical axis, $l_f$ and $l_r$, respectively represent distances from the vehicle's center of gravity to the front and rear axles of the vehicle, and $C_f$ and $C_r$ respectively represent the cornering stiffnesses of the front and rear wheels of the vehicle. Note that the cornering stiffnesses here refer to single wheels and not to a full axle. Also, $\beta$ represents a side-slip angle of the vehicle, meaning $\beta$ identifies an angle between the longitudinal axis of the vehicle and the vehicle's velocity vector. Further, $\omega$ represents a yaw rate of the vehicle, and $\delta_f$ represents a front road wheel angle of the vehicle. In addition, a state x can be defined as $x=[\beta,\omega]^T$. By including a yaw moment $M_z$ that can be obtained (such as from torque vectoring), the state-space model can be modified as follows.

$$\underbrace{\begin{bmatrix} \dot{\beta} \\ \dot{\omega} \end{bmatrix}}_{\dot{x}} = \underbrace{\begin{bmatrix} -\dfrac{2(C_r + C_f)}{mv} & \dfrac{2(l_r C_r - l_f C_f)}{mv^2} - 1 \\ \dfrac{2(l_r C_r - l_f C_f)}{I_z} & -\dfrac{2(l_r^2 C_r - l_f^2 C_f)}{I_z v} \end{bmatrix}}_{A(v)} \underbrace{\begin{bmatrix} \beta \\ \omega \end{bmatrix}}_{x} + \underbrace{\begin{bmatrix} \dfrac{2C_f}{mv} & 0 \\ \dfrac{2l_f C_f}{I_z} & \dfrac{1}{I_z} \end{bmatrix}}_{B(v)} \begin{bmatrix} \delta_f \\ M_z \end{bmatrix} \quad (2)$$

The model in Equation (2) has two inputs, namely the road wheel angle $\delta_f$ and the direct yaw moment $M_z$. This model defines the bicycle dynamics of the vehicle 200, 250 or other system 100.

To account for vehicle dynamics with respect to the path coordinate, consider the following state-space model derived from the bicycle dynamics with respect to the path coordinate.

$$\dot{\chi} = A_0 \chi + B_1 \delta_f + B_2 M_z + B_3 \dot{\psi}_{des} + B_4 \sin(\phi) \quad (3)$$

Here, the state is denoted $\chi = [e_1\ \dot{e}_1\ e_2\ \dot{e}_2]^T$ and includes the lateral and heading offsets ($e_1$, $e_2$) and their derivatives ($\dot{e}_1$, $\dot{e}_2$), and the two control inputs are $\delta_f$ and $M_z$. Also, g represents gravity acceleration, $\phi$ represents the bank angle, and $\dot{\psi}_{des} = v_x / R$ represents the road or vehicle path's radius of curvature. From this, the following can be obtained to represent the vehicle dynamics.

$$\frac{d}{dt}\begin{bmatrix} e_1 \\ \dot{e}_1 \\ e_2 \\ \dot{e}_2 \end{bmatrix} = \quad (4)$$

$$\underbrace{\begin{bmatrix} 0 & 1 & 0 & 0 \\ 0 & -\dfrac{2(C_f + C_r)}{mv_x} & \dfrac{2(C_f + C_r)}{m} & \dfrac{2(-l_f C_f + l_r C_r)}{mv_x} \\ 0 & 0 & 0 & 1 \\ 0 & \dfrac{2(-l_f C_f + l_r C_r)}{I_z v_x} & \dfrac{2(l_f C_f - l_r C_r)}{I_z} & -\dfrac{2(l_f^2 C_f + l_r^2 C_r)}{I_z v_x} \end{bmatrix}}_{A_0} \begin{bmatrix} e_1 \\ \dot{e}_1 \\ e_2 \\ \dot{e}_2 \end{bmatrix} +$$

$$\underbrace{\begin{bmatrix} 0 \\ \dfrac{2 \cdot C_f}{m} \\ 0 \\ \dfrac{2 \cdot l_f \cdot C_f}{I_z} \end{bmatrix}}_{B_1} \delta_f + \underbrace{\begin{bmatrix} 0 \\ 0 \\ 0 \\ \dfrac{1}{I_z} \end{bmatrix}}_{B_2} M_z + \underbrace{\begin{bmatrix} 0 \\ \dfrac{2(-l_f C_f + l_r C_r)}{mv_x} \\ 0 \\ -\dfrac{2(l_f^2 C_f + l_r^2 C_r)}{I_z v_x} \end{bmatrix}}_{B_3} \dot{\psi}_{des} + \underbrace{\begin{bmatrix} 0 \\ g \\ 0 \\ 0 \end{bmatrix}}_{B_4} \sin(\phi)$$

Actuator systems in their dynamics typically have their own characteristics that need to be identified in order to control the motion of an entire system. In some embodiments, among various possible actuator system identifications, a first-order delayed system may be used by the actuator coordination function 114a to approximate the characteristics of each actuator (steering control and torque vectoring control). In these embodiments, to account for actuator delays, consider the first-order delays from both actuator systems, which may be defined as follows.

$$\frac{\delta_f}{\delta_{f,cmd}} = \frac{k_1}{\tau_1 s + 1} \Rightarrow \dot{\delta}_f = -\frac{k_1}{\tau_1}\delta_f + \frac{k_1}{\tau_1}\delta_{f,cmd} \quad (5)$$

$$\frac{M_z}{M_{z,cmd}} = \frac{k_2}{\tau_2 s + 1} \Rightarrow \dot{M}_z = -\frac{k_2}{\tau_2}M_z + \frac{k_2}{\tau_2}M_{z,cmd} \quad (6)$$

Here, $\tau_1$ and $\tau_2$ respectively represent the time delays of the steering system and the torque vectoring system in the vehicle 200, 250 or other system 100. In some cases, $0 < \tau_1 < \tau_2$ to indicate that the steering system has a shorter time delay than the torque vectoring system. Also, $k_1$ and $k_2$ respectively represent the magnitudes of the first-order delay dynamics of the steering system and the torque vectoring system in the vehicle 200, 250 or other system 100, where $k_1, k_2 > 0$. The first-order delays here may indicate that the steering system might typically be faster than the torque vectoring system in the response of generating yaw moment (although this need not always be the case). The various parameters of delay ($\tau_1$ and $\tau_2$) and magnitude ($k_1$ and $k_2$) can be determined in any suitable manner, such as by performing system identification. For example, in a single-input single-output (SISO) system, system identification can be performed by applying different inputs (such as step, ramp, or other inputs) while measuring the system's output and then approximating a first-order delayed system mathematically based on the known inputs and measured outputs.

Figure 3A:
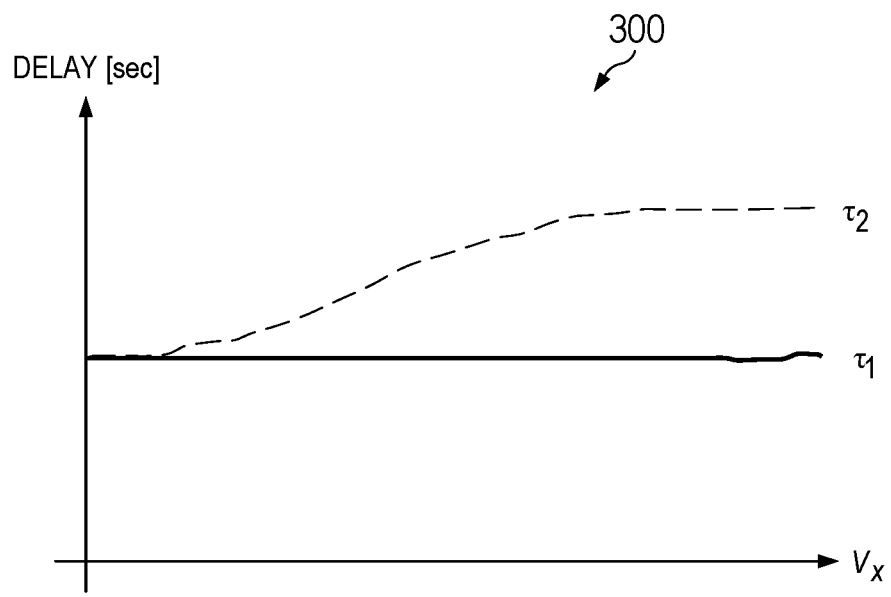
FIGS. 3A and 3B illustrate example characteristics of actuators in a vehicle supporting emergency motion control using steering and torque vectoring according to this disclosure.
Figure 3B:
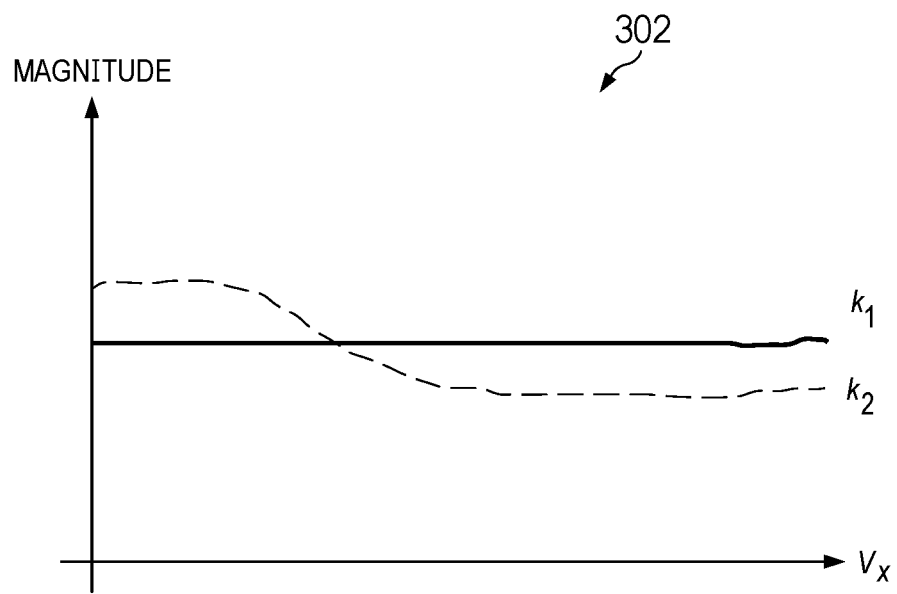

The first-order delayed systems that are identified for steering control and torque vectoring control actuators in a specific vehicle 200, 250 or other system 100 can vary based on the specific characteristics of those actuators. FIGS. 3A and 3B illustrate example characteristics of actuators in a vehicle supporting emergency motion control using steering and torque vectoring according to this disclosure. More specifically, FIG. 3A illustrates an example graph 300 plotting the time delays of actuators based on velocity, and FIG.

3B illustrates an example graph 302 plotting the magnitudes of the first-order delay dynamics of the actuators based on velocity.

As can be seen in FIG. 3A, the time delay ($\tau_1$) associated with the steering system is relatively steady with changing velocity. This indicates that the steering system can be used to provide a relatively fast response time (with little if any delay) regardless of the velocity of the vehicle 200, 250 or other system 100. In contrast, the time delay ($\tau_2$) associated with the torque vectoring system increases based on velocity. This indicates that the torque vectoring system will have longer delays and take larger amounts of time to create lateral position changes or other movements of the vehicle 200, 250 or other system 100 as the velocity increases.

As can be seen in FIG. 3B, the magnitude ($k_1$) of the first-order delay dynamics of the steering system is relatively steady with changing velocity. This indicates that the magnitude of the first-order delay dynamics of the steering system remains generally consistent regardless of the velocity of the vehicle 200, 250 or other system 100. However, the magnitude ($k_2$) of the first-order delay dynamics of the torque vectoring system goes from a relatively high value (higher than the $k_1$ value) to a relatively low value (lower than the $k_1$ value) as the velocity increases. This indicates that the magnitude of the response for the torque vectoring system may be higher at slower velocities and lower at faster velocities. Note that these graphs 300 and 302 can easily vary if and when different actuators are present in the vehicle 200, 250 or other system 100.

By including these types of actuator dynamics into the bicycle model, the overall bicycle dynamics of the path coordinate for the vehicle 200, 250 or other system 100 can be expressed as follows.

$$\dot{E} = AE + BU + B_\psi \dot{\psi}_{des} + B_\phi \sin(\phi) \quad (7)$$

Here:

$$\underbrace{\begin{bmatrix} \dot{X} \\ \dot{\delta}_f \\ \dot{M}_z \end{bmatrix}}_{\dot{E}} = \underbrace{\begin{bmatrix} A_0 & B_1 & B_2 \\ 0_{1\times 4} & -\frac{1}{\tau_1} & 0 \\ 0_{1\times 4} & 0 & -\frac{1}{\tau_2} \end{bmatrix}}_{A} \underbrace{\begin{bmatrix} X \\ \delta_f \\ M_z \end{bmatrix}}_{E} + \quad (8)$$

$$\underbrace{\begin{bmatrix} 0_{4\times 1} & 0_{4\times 1} \\ \frac{k_1}{\tau_1} & 0 \\ 0 & \frac{k_2}{\tau_2} \end{bmatrix}}_{B} \underbrace{\begin{bmatrix} \delta_{f,cmd} \\ M_{z,cmd} \end{bmatrix}}_{U} + \underbrace{\begin{bmatrix} B_3 \\ 0 \\ 0 \end{bmatrix}}_{B_\psi} \dot{\psi}_{des} + \underbrace{\begin{bmatrix} B_4 \\ 0 \\ 0 \end{bmatrix}}_{B_\phi} \sin(\phi)$$

In Equations (7) and (8), the state is represented as $E \in \mathbb{R}^6$ with a system matrix $A \in \mathbb{R}^{6 \times 6}$, and the input is represented as $U \in E\mathbb{R}^2$ with a control matrix $B \in \mathbb{R}^{6 \times 2}$. The state-space model here includes the bicycle dynamics represented at the path coordinates and the first-order delay dynamics of the steering and torque vectoring systems.

The state-space model in Equations (7) and (8) is a time-varying linear system, so a linear controller can be implemented by the actuator coordination function 114a and operated using this state-space model. If further compensations may be needed for any uncertainties or nonlinearities, a nonlinear controller can be implemented by the actuator coordination function 114a and operated in parallel with the linear controller. For example, a linear quadratic regulator (LQR) can be used to control the system above and to control feedback, which in some cases may be designed as follows.

$$U_{feedback} = -K \cdot E \quad (9)$$

Here, the feedback portion is from the total control $U = U_{feedback} + U_{feedforward}$, and $K \in \mathbb{R}^{2 \times 6}$ can be calculated by the linear quadratic regulator, such as by using a semi-positive weighting matrix $0 \leq Q \in \mathbb{R}^{6 \times 6}$ at state E and a positive-definite weighting matrix $0 < R \in \mathbb{R}^{2 \times 2}$ at input U.

During an emergency maneuver or other movement, steering control and torque vectoring control may be used (individually or in combination) to help provide lateral movement or other movement of the vehicle 200, 250 or other system 100 in order to follow a desired path, such as a path around an obstacle. Both techniques (steering control and torque vectoring control) can be used to provide lateral acceleration of the vehicle 200, 250 or other system 100. In general, the steering control may be used to provide a higher lateral acceleration of the vehicle 200, 250 or other System 100 compared to the torque vectoring control. However, a higher lateral acceleration might cause the vehicle 200, 250 or other system 100 to approach or even surpass the vehicle tire limits of the tires of the vehicle 200, 250 or other system 100. Causing the vehicle 200, 250 or other system 100 to approach or surpass its vehicle tire limits may cause the vehicle 200, 250 or other system 100 to become unstable and prevent the vehicle 200, 250 or other system 100 from following a desired evasive path. Thus, the actuator coordination function 114a can consider these factors when determining how to implement desired path control operations using steering control and/or torque vectoring control.

Figure 4:
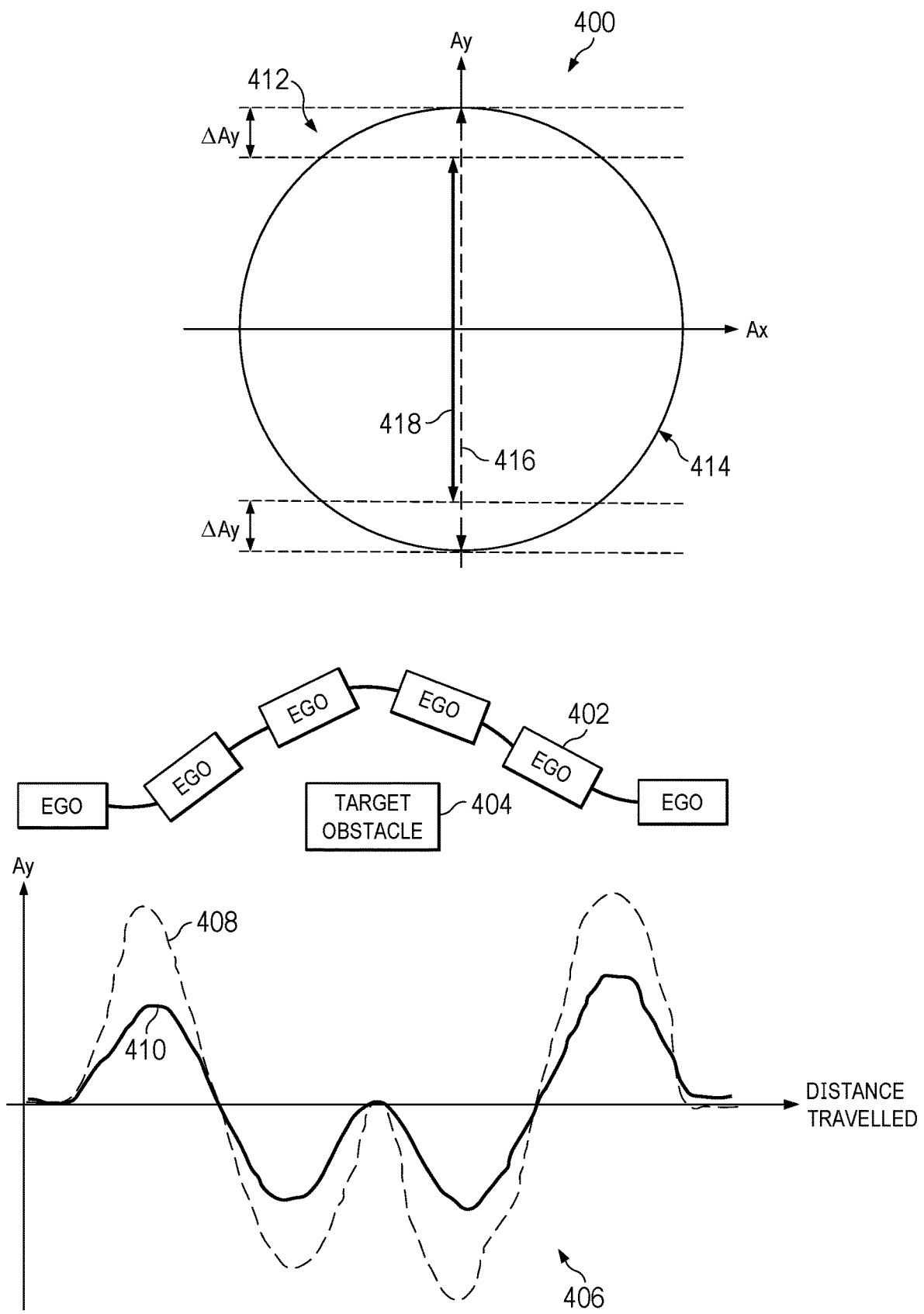
FIG. 4 illustrates example limit handling during emergency motion control for a vehicle using steering and torque vectoring according to this disclosure.

FIG. 4 illustrates example limit handling 400 during emergency motion control for a vehicle using steering and torque vectoring according to this disclosure. In this example, a vehicle 402 (which may represent or include the vehicle 200, 250 or other system 100) is approaching a target obstacle 404, which may be detected by the object detection/tracking function 108. The vehicle 402 determines that emergency maneuvers should be performed to move the vehicle 402 out of its current traffic lane into an adjacent traffic lane and then back into the original traffic lane. This type of back-and-forth maneuver may be common in various circumstances, such as when a person or object moves into the vehicle's current traffic lane or when a stationary object (like a stalled vehicle or debris) is detected within the vehicle's current traffic lane.

A graph 406 in FIG. 4 illustrates how different control techniques (namely steering control only or steering control and torque vectoring control) can be used to provide different amounts of lateral acceleration to the vehicle 402 in order to perform the emergency maneuver shown in FIG. 4. More specifically, the graph 406 plots the lateral acceleration (Ay) of the vehicle 402 over distance traveled. A curve 408 represents the lateral acceleration that may be used to perform the emergency maneuver based on steering control only, while a curve 410 represents the lateral acceleration that may be used to perform the emergency maneuver based on steering control and torque vectoring control. As can be seen in the graph 406 of FIG. 4, the curve 408 indicates that larger lateral accelerations are achieved using steering control only compared to the lateral accelerations represented by the curve 410 when performing the emergency maneuver. In both cases, the emergency maneuver can be performed successfully, but the combined use of steering control and torque vectoring control involves lower lateral accelerations compared to the use of steering control only.

A graph 412 in FIG. 4 illustrates a limit 414 on total acceleration (lateral acceleration plus longitudinal acceleration) for the vehicle 402, such as a tire limit that may exist based on the tires of the vehicle 402. More specifically, the horizontal axis of the graph 412 represents longitudinal acceleration (Ax), and the vertical axis of the graph 412 represents lateral acceleration (Ay). Longitudinal and/or lateral accelerations by the vehicle 402 that approach or exceed the limit 414 may cause unstable motion of the vehicle 402 and (ideally) should be avoided if possible. The diagram of the limit 414 shown here may sometimes be referred to as a "friction circle," and saturation is said to occur if a vector representing the total longitudinal and lateral accelerations of the vehicle 402 touches or extends outside of the friction circle.

The graph 412 here also illustrates maximum lateral accelerations 416 associated with performing the emergency maneuver using steering control only and maximum lateral accelerations 418 associated with performing the emergency maneuver using steering control and torque vectoring control. As can be seen in the graph 412 of FIG. 4, the lateral accelerations 416 associated with performing the emergency maneuver using steering control only may be close to the limit 414 or even violate the limit 414 under some circumstances (such as depending on road conditions). That may be undesirable since it can result in unstable movement of the vehicle 402, but it may be necessary or required in some cases if the steering and torque vectoring control cannot provide the desired lateral acceleration in order to perform an emergency maneuver or other movement of the vehicle 402. The lateral accelerations 418 associated with performing the emergency maneuver using steering control and torque vectoring control involve lower accelerations than the use of steering control only, and the differences in maximum lateral accelerations are identified as ΔAy. Thus, a combination of steering control and torque vectoring control may be used in some cases (where appropriate) to provide the necessary or desired path control while reducing, the likelihood of violating the limit 414. In other cases, it may be necessary or desirable to use steering control only, or it may be necessary or desirable to use torque vectoring control only.

Among other things, the actuator coordination function 114a determines how to coordinate the use of steering control and torque vectoring control to provide desired path tracking in a given circumstance (such as during an emergency or evasive maneuver or other movement). This determination is based in part on the response time of each actuation system. This determination is also based in part on tire saturation, meaning whether the total acceleration or the lateral acceleration would approach or violate the limit 414. Violation of the limit 414 may typically be caused by excessive steering input at high speeds. In some embodiments, the actuator coordination function 114a can apply weights to the steering control and torque vectoring control in order to identify the extent to which each type of control is used to perform path tracking operations. In particular embodiments, the weights R may be expressed in the following form.

$$R = \begin{bmatrix} R_\delta & 0 \\ 0 & R_M \end{bmatrix} \tag{10}$$

Here:

$$R_\delta = \frac{b}{1 + e^{-a(x-x_0)}} + c \tag{11}$$

$$R_M = \frac{b}{1 + e^{a(x-x_0)}} + c \tag{12}$$

In these equations, x represents lateral acceleration, which in some cases may be determined as the product of speed and yaw rate ($v_x \cdot \omega$) or a filtered version thereof. Also, $R_\delta$ and $R_M$ respectively represent the weights for steering control and torque vectoring control. In addition, a, b, c, and $x_0$ are tuning parameters, each of which may be greater than zero and tuned based on the actual response of the associated actuation system. As can be seen here, these weights may be determined based on the needed lateral acceleration.

Figure 5:
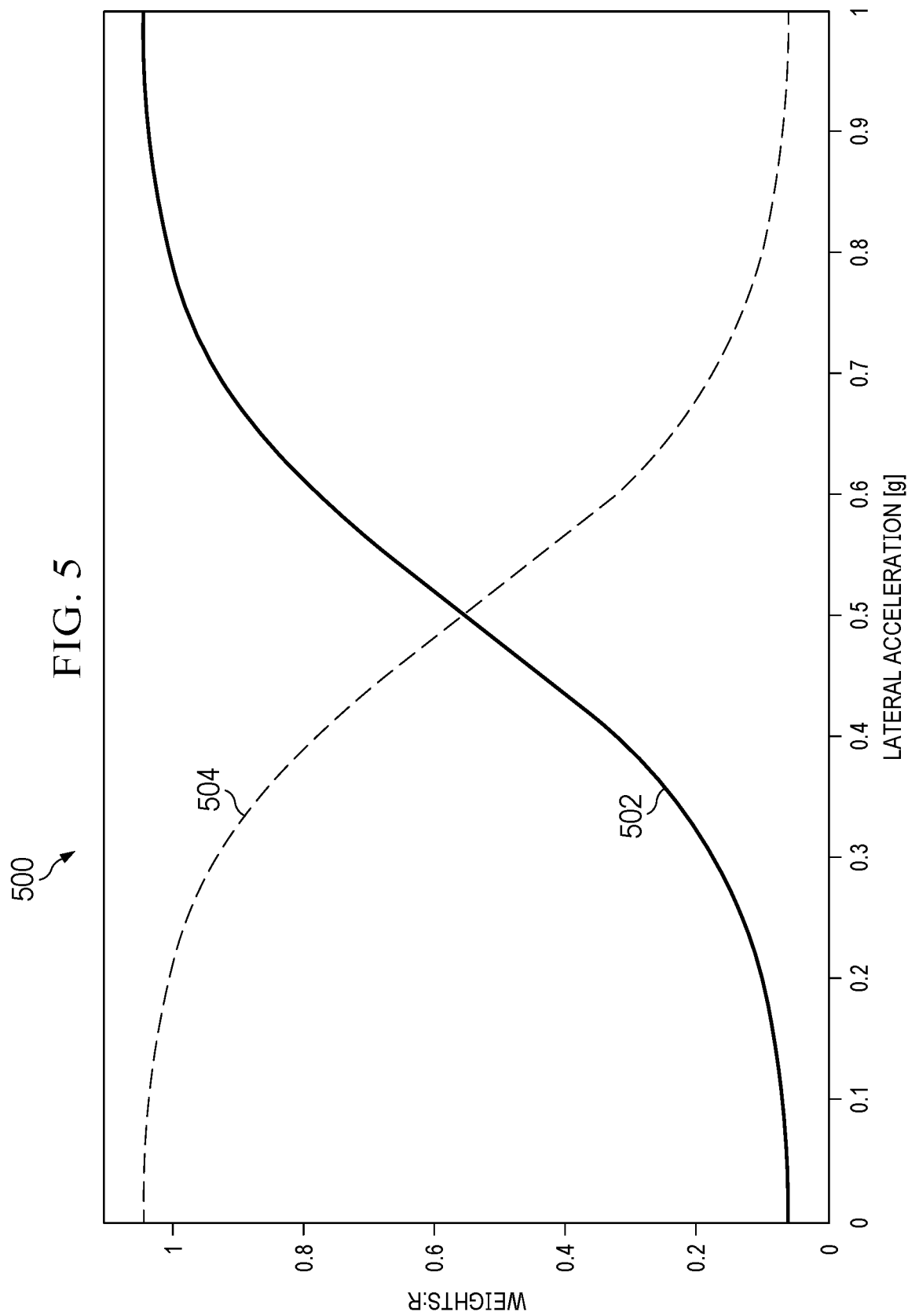
FIG. 5 illustrates example weights for steering and torque vectoring controls based on lateral acceleration according to this disclosure.

FIG. 5 illustrates example weights for steering and torque vectoring controls based on lateral acceleration according to this disclosure. More specifically, FIG. 5 contains a graph 500 that plots weights for steering control and torque vectoring control at different lateral accelerations. In the graph 500, a curve 502 represents the weight for steering control, and a curve 504 represents the weight for torque vectoring control. In this example, the weight for steering control is generally lower and the weight for torque vectoring control is generally higher at lower lateral accelerations, and the weight for steering control is generally higher and the weight for torque vectoring control is generally lower at higher lateral accelerations.

When the weights are used by a linear quadratic regulator (where a weight matrix functions as a penalty), lower weight values translate into larger control efforts and vice versa. Thus, in this example, lower lateral accelerations have a lower weight for steering control and a higher weight for torque vectoring control. As a result, steering control plays a larger role and provides a faster response (compared to torque vectoring control) at these lower lateral accelerations. As the lateral acceleration increases, torque vectoring control becomes more dominant in the control scheme to help reduce or prevent the tires of the vehicle 402 from being saturated.

However allocated, the steering control and torque vectoring control techniques can ideally be used individually or collectively to track the desired path of the vehicle 402 while avoiding approaching or exceeding any limit 414. Note that, at larger lateral accelerations, smaller total amounts of acceleration may be needed, which provides the decision planning function 112 with more room to perform motion planning (and possibly provide more severe paths for the vehicle).

Although FIGS. 3A and 3B illustrate examples of characteristics of actuators in a vehicle supporting emergency motion control using steering and torque vectoring and FIG. 4 illustrates one example of limit handling during emergency motion control for a vehicle using steering and torque vectoring, various changes may be made to FIGS. 3A through 4. For example, the specific graphs and other information shown in FIGS. 3A through 4 are for illustration only. The characteristics of specific actuators and specific vehicles or other systems can vary from those that are shown here. Although FIG. 5 illustrates one example of weights for steering and torque vectoring controls based on lateral acceleration, various changes may be made to FIG. 5. For instance, other weights may be used for steering and torque vectoring control, such as weights that transition more quickly or more slowly or weights that are directly proportional (rather than inversely proportional) to control efforts.

Figure 6:
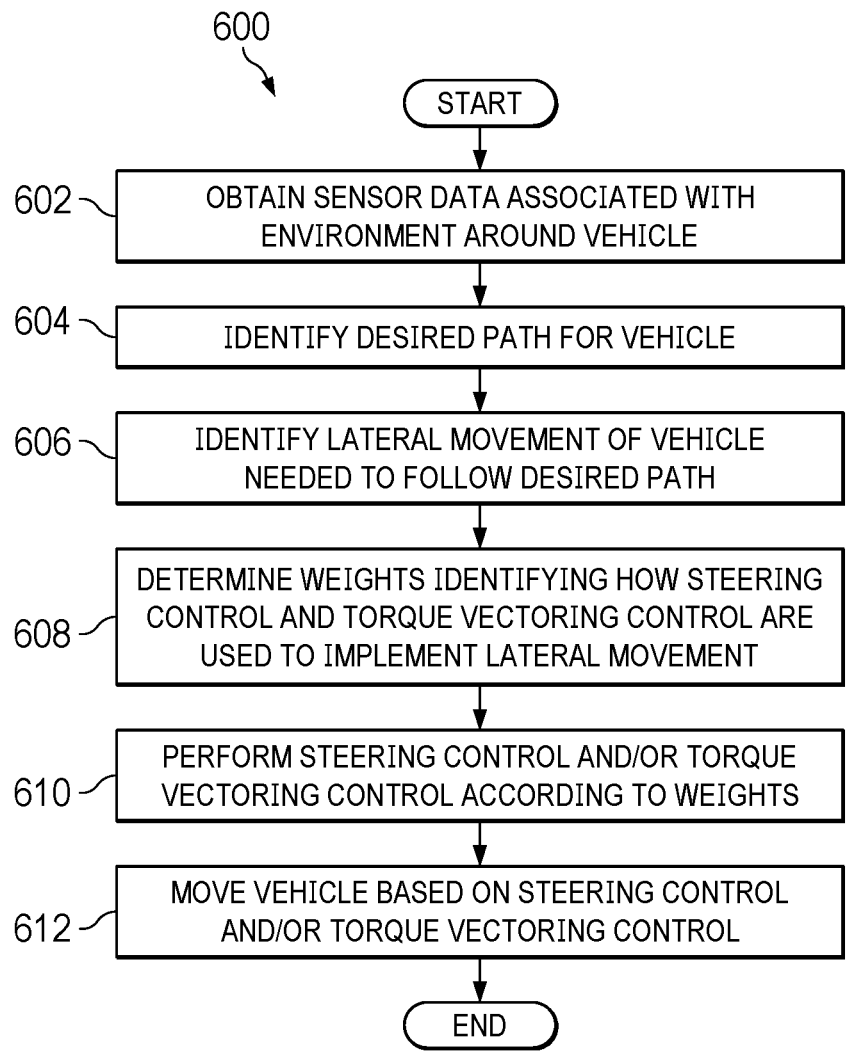
FIG. 6 illustrates an example method for emergency motion control for a vehicle using steering and torque vectoring according to this disclosure.

FIG. 6 illustrates an example method 600 for emergency motion control for a vehicle using steering and torque vectoring according to this disclosure. For ease of explanation, the method 600 shown in FIG. 6 is described as being performed by the system 100 shown in FIG. 1, which may include or represent one of the vehicles 200, 250, 402 shown in FIGS. 2A, 2B, and 4. However, the method 600 shown in FIG. 6 may be performed using any other suitable device or system.

As shown in FIG. 6, sensor data associated with an environment around a vehicle is obtained at step 602. This may include, for example, the processor 102 of a vehicle 200, 250, 402 or other system 100 obtaining information from one or more sensors 104, such as image data from one or more cameras 104a. A desired path for the vehicle is identified at step 604. This may include, for example, the processor 102 identifying other vehicles, objects, lane-marking lines, and other features around the vehicle 200, 250, 402 or other system 100. This may also include the processor 102 predicting a behavior of the vehicle 200, 250, 402 or other system 100 based on lane-marking lines and the predicted behaviors of other vehicles or objects around the vehicle 200, 250, 402 or other system 100. This may further include the processor 102 selecting a desired path around another vehicle, object, or other obstacle 404. In some cases, the desired path can be expressed as a lateral offset, a heading offset, a curvature, and a rate of curvature.

A lateral movement of the vehicle needed to follow the desired path is identified at step 606. This may include, for example, the processor 102 identifying a lateral distance or other lateral difference between a current path of travel for the vehicle 200, 250, 402 or other system 100 and the desired path. Weights identifying how steering control and torque vectoring control are used to implement the lateral movement in order to follow the desired path are determined at step 608. This may include, for example, the processor 102 using the state-space model and other equations described above to determine the weights for steering control and torque vectoring control. The weights are determined while considering actuator time delays associated with the steering control and the torque vectoring control and vehicle limits such as tire limits. As a particular example, the processor 102 may determine whether the desired path can be followed using steering control with higher lateral acceleration or using steering and torque vectoring control using lower lateral acceleration and whether either lateral acceleration approaches or violates a tire limit (such as the limit 414).

One or both of steering control and torque vectoring control are performed based on their weights at step 610, which causes the vehicle to move at step 612. This may include, for example, the processor 102 initiating a greater amount of control action through steering control than torque vectoring control at lower lateral accelerations or initiating a greater amount of control action through torque vectoring control than steering control at higher lateral accelerations. This may also include the vehicle 200, 250, 402 or other system 100 moving laterally to the left or right based on the applied steering control and/or torque vectoring control.

Although FIG. 6 illustrates one example of a method 600 for emergency motion control for a vehicle using steering and torque vectoring, various changes may be made to FIG. 6. For example, while shown as a series of steps, various steps in FIG. 6 may overlap, occur in parallel, occur in a different order, or occur any number of times. As a particular example, the steps of FIG. 6 may be repeatedly performed in an overlapping manner so that a current lateral movement of the vehicle can be determined and implemented while additional sensor data is being received and processed to determine a future lateral movement of the vehicle.

Note that many functional aspects of the embodiments described above can be implemented using any suitable hardware or any suitable combination of hardware and software/firmware instructions. In some embodiments, at least some functional aspects of the embodiments described above can be embodied as software instructions that are executed by one or more unitary or multi-core central processing units or other processing device(s). In other embodiments, at least some functional aspects of the embodiments described above can be embodied using one or more application specific integrated circuits (ASICs). When implemented using one or more ASICs, any suitable integrated circuit design and manufacturing techniques may be used, such as those that can be automated using electronic design automation (EDA) tools. Examples of such tools include tools provided by SYNOPSYS, INC., CADENCE DESIGN SYSTEMS, INC., and SIEMENS EDA.

Figure 7:
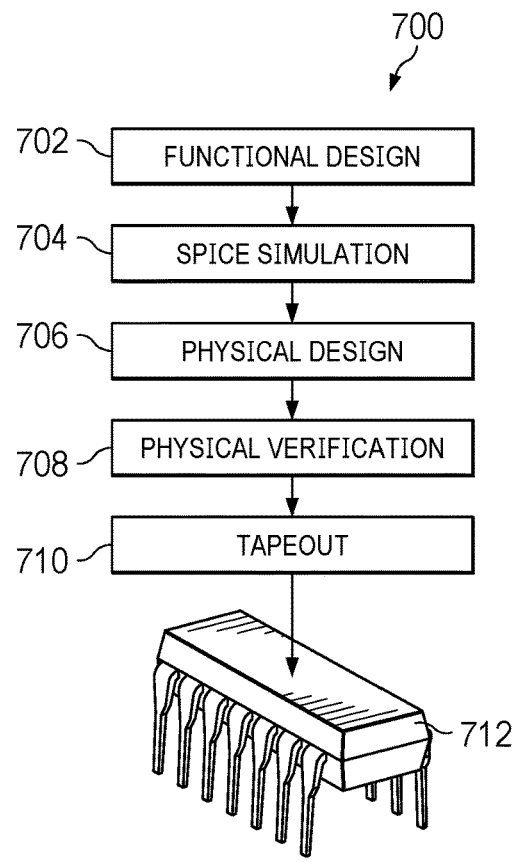
FIG. 7 illustrates an example design flow for employing one or more tools to design hardware that implements one or more control functions according to this disclosure.

FIG. 7 illustrates an example design flow 700 for employing on or more tools to design hardware that implements one or more control functions according to this disclosure. More specifically, the design flow 700 here represents a simplified ASIC design flow employing one or more FDA tools or other tools for designing and facilitating fabrication of ASICs that implement at least some functional aspects of the various embodiments described above.

As shown in FIG. 7, a functional design of an ASIC is created at step 702. For any portion of the ASIC design that is digital in nature, in some cases, this may include expressing the digital functional design by generating register transfer level (RTL) code in a hardware descriptive language (HDL), such as VHDL or VERILOG. A functional verification (such as a behavioral simulation) can be performed on HDL data structures to ensure that the RTL code that has been generated is in accordance with logic specifications. In other cases, a schematic of digital logic can be captured and used, such as through the use of a schematic capture program. For any portion of the ASIC design that is analog in nature, this may include expressing the analog functional design by generating a schematic, such as through the use of a schematic capture program. The output of the schematic capture program can be converted (synthesized), such as into gate/transistor level netlist data structures. Data structures or other aspects of the functional design are simulated, such as by using a simulation program with integrated circuits emphasis (SPICE), at step 704. This may include, for example, using the SPICE simulations or other simulations to verify that the functional design of the ASIC performs as expected.

A physical design of the ASIC is created based on the validated data structures and other aspects of the functional design at step 706. This may include, for example, instantiating the validated data structures with their geometric representations. In some embodiments, creating a physical layout includes "floor-planning," where gross regions of an integrated circuit chip are assigned and input/output (I/O) pins are defined. Also, hard cores (such as arrays, analog blocks, inductors, etc.) can be placed within the gross regions based on design constraints (such as trace lengths, timing, etc.). Clock wiring, which is commonly referred to or implemented as clock trees, can be placed within the integrated circuit chip, and connections between gates/analog blocks can be routed within the integrated circuit chip. When all elements have been placed, a global and detailed routing can be performed to connect all of the elements together. Post-wiring optimization may be performed to improve performance (such as timing closure), noise (such as signal integrity), and yield. The physical layout can also be modified where possible while maintaining compliance with design rules that are set by a captive, external, or other semiconductor manufacturing foundry of choice, which can make the ASIC more efficient to produce in bulk. Example modifications may include adding extra vias or dummy metal/diffusion/poly layers.

The physical design is verified at step 708. This may include, for example, performing design rule checking (DRC) to determine whether the physical layout of the ASIC satisfies a series of recommended parameters, such as design rules of the foundry. In some cases, the design rules represent a series of parameters provided by the foundry that are specific to a particular semiconductor manufacturing process. As particular examples, the design rules may specify certain geometric and connectivity restrictions to ensure sufficient margins to account for variability in semiconductor manufacturing processes or to ensure that the ASICs work correctly. Also, in some cases, a layout versus schematic (LVS) check can be performed to verify that the physical layout corresponds to the original schematic or circuit diagram of the design. In addition, a complete simulation may be performed to ensure that the physical layout phase is properly done.

After the physical layout is verified, mask generation design data is generated at step 710. This may include, for example, generating mask generation design data for use in creating photomasks to be used during ASIC fabrication. The mask generation design data may have any suitable form, such as GDSII data structures. This step may be said to represent a "tape-out" for preparation of the photomasks. The GDSII data structures or other mask generation design data can be transferred through a communications medium (such as via a storage device or over a network) from a circuit designer or other party to a photomask supplier/maker or to the semiconductor foundry itself. The photomasks can be created and used to fabricate ASIC devices at step 712.

Although FIG. 7 illustrates one example of a design flow 700 for employing one or more tools to design hardware that implements one or more vehicle control functions, various changes may be made to FIG. 7. For example, at least some functional aspects of the various embodiments described above may be implemented in any other suitable manner.

Figure 8:
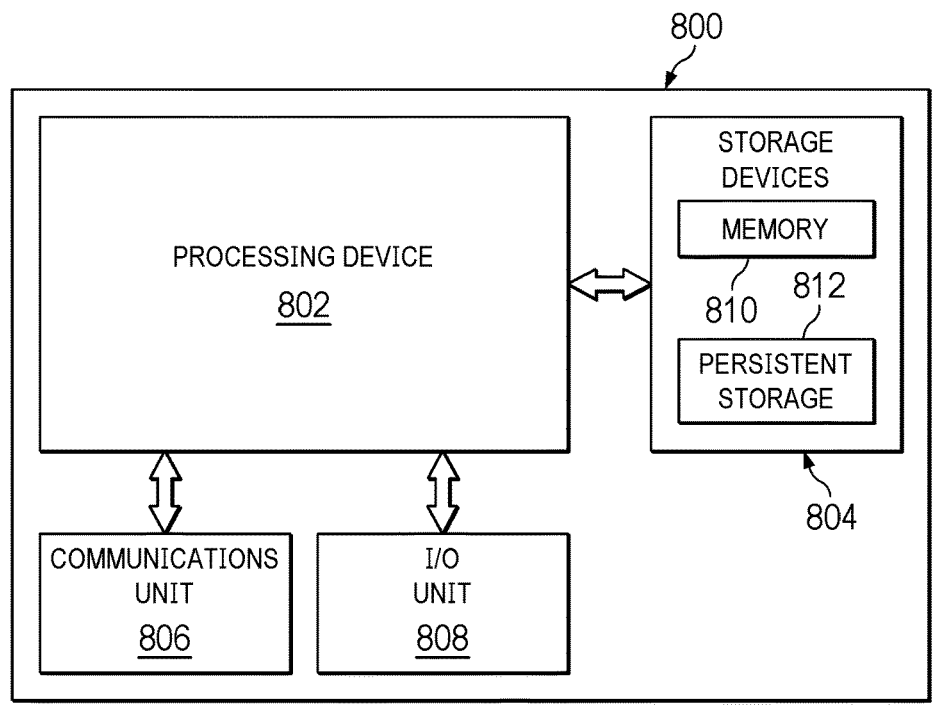
FIG. 8 illustrates an example device supporting execution of one or more tools to design hardware that implements one or more control functions according to this disclosure.

FIG. 8 illustrates an example device 800 supporting execution of one or more tools to design hardware that implements one or more vehicle control functions according to this disclosure. The device 800 may, for example, be used to implement at least part of the design flow 700 shown in FIG. 7. However, the design flow 700 may be implemented in any other suitable manner.

As shown in FIG. 8, the device 800 denotes a computing device or system that includes at least one processing device 802, at least one storage device 804, at least one communications unit 806, and at least one input/output (I/O) unit 808. The processing device 802 may execute instructions that can be loaded into a memory 810. The processing device 802 includes any suitable number(s) and type(s) of processors or other processing devices in any suitable arrangement. Example types of processing devices 802 include one or more microprocessors, microcontrollers, digital signal processors (DSPs), application specific integrated circuits (ASICs), field programmable gate arrays (FPGAs), or discrete circuitry.

The memory 810 and a persistent storage 812 are examples of storage devices 804, which represent any structure(s) capable of storing and facilitating retrieval of information (such as data, program code, and/or other suitable information on a temporary or permanent basis). The memory 810 may represent a random access memory or any other suitable volatile or non-volatile storage device(s). The persistent storage 812 may contain one or more components or devices supporting longer-term storage of data, such as a read only memory, hard drive, Flash memory, or optical disc.

The communications unit 806 supports communications with other systems or devices. For example, the communications unit 806 can include a network interface card or a wireless transceiver facilitating communications over a wired or wireless network. The communications unit 806 may support communications through any suitable physical or wireless communication link(s).

The I/O unit 808 allows for input and output of data. For example, the I/O unit 808 may provide a connection for user input through a keyboard, mouse, keypad, touchscreen, or other suitable input device. The I/O unit 808 may also send output to a display or other suitable output device. Note, however, that the I/O unit 808 may be omitted if the device 800 does not require local I/O, such as when the device 800 represents a server or other device that can be accessed remotely.

The instructions that are executed by the processing device 802 include instructions that implement at least part of the design flow 700. For example, the instructions that are executed by the processing device 802 may cause the processing device 802 to generate or otherwise obtain functional designs, perform simulations, generate physical designs, verify physical designs, perform tape-outs, or create/use photomasks (or any combination of these functions). As a result, the instructions that are executed by the processing device 802 support the design and fabrication of ASIC devices or other devices that implement one or more vehicle control functions described above.

Although FIG. 8 illustrates one example of a device 800 supporting execution of one or more tools to design hardware that implements one or more vehicle control functions, various changes may be made to FIG. 8. For example, computing and communication devices and systems come in a wide variety of configurations, and FIG. 8 does not limit this disclosure to any particular computing or communication device or system.

In some embodiments, various functions described in this patent document are implemented or supported using machine-readable instructions that are stored on a non-transitory machine-readable medium. The phrase "machine-readable instructions" includes any type of instructions, including source code, object code, and executable code. The phrase "non-transitory machine-readable medium" includes any type of medium capable of being accessed by one or more processing devices or other devices, such as a read only memory (ROM), a random access memory (RAM), a Flash memory, a hard disk drive (HDD), or any other type of memory. A "non-transitory" medium excludes wired, wireless, optical, or other communication links that transport transitory electrical or other signals. Non-transitory media include media where data can be permanently stored and media where data can be stored and later overwritten.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   identifying a desired path for an ego vehicle;
   determining how to apply steering control and torque vectoring control to cause the ego vehicle to follow the desired path, the determination based on (i) actuator delays associated with the steering control and the torque vectoring control and (ii) one or more limits of the ego vehicle; and
   applying at least one of the steering control and the torque vectoring control to create lateral movement of the ego vehicle during travel;
   wherein determining how to apply the steering control and the torque vectoring control comprises using a state-space model that incorporates bicycle dynamics of the ego vehicle and incorporates first-order time delays associated with the steering control and the torque vectoring control, the bicycle dynamics of the ego vehicle based on inputs that include (i) lateral and heading offsets of the ego vehicle and derivatives thereof, (ii) a road wheel angle of the ego vehicle, and (iii) a yaw moment of the ego vehicle.

2. The method of claim 1, wherein:
   determining how to apply the steering control and the torque vectoring control further comprises generating weights for the steering control and the torque vectoring control; and
   applying at least one of the steering control and the torque vectoring control comprises applying at least one of the steering control and the torque vectoring control based on the weights.

3. The method of claim 2, wherein the weights are based on a lateral acceleration needed by the ego vehicle to follow the desired path.

4. The method of claim 1, wherein determining how to apply the steering control and the torque vectoring control further comprises:
   using a linear quadratic regulator to determine how to control the ego vehicle based on the state-space model and the one or more limits of the ego vehicle.

5. The method of claim 1, wherein:
   the one or more limits of the ego vehicle comprise an acceleration limit identifying a limit on lateral or total acceleration by the ego vehicle; and
   determining how to apply the steering control and the torque vectoring control further comprises determining how to apply the steering control and the torque vectoring control based on the acceleration limit, a maximum acceleration associated with use of the steering control only to follow the desired path, and a maximum acceleration associated with use of the steering control and the torque vectoring control to follow the desired path.

6. The method of claim 1, wherein applying at least one of the steering control and the torque vectoring control comprises:
   applying the steering control to a greater extent than the torque vectoring control when a lower lateral acceleration of the ego vehicle is needed to follow the desired path; and
   applying the torque vectoring control to a greater extent than the steering control when a higher lateral acceleration of the ego vehicle is needed to follow the desired path.

7. The method of claim 1, wherein identifying the desired path comprises identifying the lateral offset, the heading offset, a curvature, and a rate of curvature for the desired path.

8. An apparatus comprising:
   at least one processing device configured to:
      identify a desired path for an ego vehicle;
      determine how to apply steering control and torque vectoring control to cause the ego vehicle to follow the desired path based on (i) actuator delays associated with the steering control and the torque vectoring control and (ii) one or more limits of the ego vehicle; and
      apply at least one of the steering control and the torque vectoring control to create lateral movement of the ego vehicle during travel;
   wherein, to determine how to apply the steering control and the torque vectoring control, the at least one processing device is configured to use a state-space model that incorporates bicycle dynamics of the ego vehicle and incorporates first-order time delays associated with the steering control and the torque vectoring control, the bicycle dynamics of the ego vehicle based on inputs that include (i) lateral and heading offsets of the ego vehicle and derivatives thereof, (ii) a road wheel angle of the ego vehicle, and (iii) a yaw moment of the ego vehicle.

9. The apparatus of claim 8, wherein:
   to determine how to apply the steering control and the torque vectoring control, the at least one processing device is further configured to generate weights for the steering control and the torque vectoring control; and to apply at least one of the steering control and the torque vectoring control, the at least one processing device is configured to apply at least one of the steering control and the torque vectoring control based on the weights.

10. The apparatus of claim 9, wherein the weights are based on a lateral acceleration needed by the ego vehicle to follow the desired path.

11. The apparatus of claim 8, wherein, to determine how to apply the steering control and the torque vectoring control, the at least one processing device is further configured to:

use a linear quadratic regulator to determine how to control the ego vehicle based on the state-space model and the one or more limits of the ego vehicle.

12. The apparatus of claim 8, wherein:

the one or more limits of the ego vehicle comprise an acceleration limit identifying a limit on lateral or total acceleration by the ego vehicle; and the at least one processing device is configured to determine how to apply the steering control and the torque vectoring control based on the acceleration limit, a maximum acceleration associated with use of the steering control only to follow the desired path, and a maximum acceleration associated with use of the steering control and the torque vectoring control to follow the desired path.

13. The apparatus of claim 8, wherein, to apply at least one of the steering control and the torque vectoring control, the at least one processing device is configured to:

apply the steering control to a greater extent than the torque vectoring control when a lower lateral acceleration of the ego vehicle is needed to follow the desired path; and apply the torque vectoring control to a greater extent than the steering control when a higher lateral acceleration of the ego vehicle is needed to follow the desired path.

14. The apparatus of claim 8, wherein, to identify the desired path, the at least one processing device is configured to identify the lateral offset, the heading offset, a curvature, and a rate of curvature for the desired path.

15. A non-transitory machine-readable medium containing instructions that when executed cause at least one processor to:

identify a desired path for an ego vehicle;

determine how to apply steering control and torque vectoring control to cause the ego vehicle to follow the desired path based on (i) actuator delays associated with the steering control and the torque vectoring control and (ii) one or more limits of the ego vehicle; and apply at least one of the steering control and the torque vectoring control to create lateral movement of the ego vehicle during travel;

wherein the instructions that when executed cause the at least one processor to determine how to apply the steering control and the torque vectoring control comprise instructions that when executed cause the at least one processor to use a state-space model that incorporates bicycle dynamics of the ego vehicle and incorporates first-order time delays associated with the steering control and the torque vectoring control, the bicycle dynamics of the ego vehicle based on inputs that include (i) lateral and heading offsets of the ego vehicle and derivatives thereof, (ii) a road wheel angle of the ego vehicle, and (iii) a yaw moment of the ego vehicle.

16. The non-transitory machine-readable medium of claim 15, wherein:

the instructions that when executed cause the at least one processor to determine how to apply the steering control and the torque vectoring control further comprise instructions that when executed cause the at least one processor to generate weights for the steering control and the torque vectoring control; and the instructions that when executed cause the at least one processor to apply at least one of the steering control and the torque vectoring control comprise instructions that when executed cause the at least one processor to apply at least one of the steering control and the torque vectoring control based on the weights.

17. The non-transitory machine-readable medium of claim 16, wherein the weights are based on a lateral acceleration needed by the ego vehicle to follow the desired path.

18. The non-transitory machine-readable medium of claim 15, wherein the instructions that when executed cause the at least one processor to determine how to apply the steering control and the torque vectoring control further comprise instructions that when executed cause the at least one processor to:

use a linear quadratic regulator to determine how to control the ego vehicle based on the state-space model and the one or more limits of the ego vehicle.

19. The non-transitory machine-readable medium of claim 15, wherein:

the one or more limits of the ego vehicle comprise an acceleration limit identifying a limit on lateral or total acceleration by the ego vehicle; and the instructions that when executed cause the at least one processor to determine how to apply the steering control and the torque vectoring control further comprise instructions that when executed cause the at least one processor to determine how to apply the steering control and the torque vectoring control based on the acceleration limit, a maximum acceleration associated with use of the steering control only to follow the desired path, and a maximum acceleration associated with use of the steering control and the torque vectoring control to follow the desired path.

20. The non-transitory machine-readable medium of claim 15, wherein the instructions that when executed cause the at least one processor to apply at least one of the steering control and the torque vectoring control comprise instructions that when executed cause the at least one processor to:

apply the steering control to a greater extent than the torque vectoring control when a lower lateral acceleration of the ego vehicle is needed to follow the desired path; and apply the torque vectoring control to a greater extent than the steering control when a higher lateral acceleration of the ego vehicle is needed to follow the desired path.

21. The non-transitory machine-readable medium of claim 15, wherein the instructions that when executed cause the at least one processor to identify the desired path comprise instructions that when executed cause the at least one processor to identify the lateral offset, the heading offset, a curvature, and a rate of curvature for the desired path.

* * * * *